(12) United States Patent
Keschwari Rasti (10) Patent No.: US 10,000,220 B2
(45) Date of Patent: Jun. 19, 2018

(54) BRAKE CYLINDER WITH INTEGRATED WEAR ADJUSTING DEVICE FOR RAIL VEHICLES

(71) Applicant: KES Keschwari Electronic Systems GmbH & Co. KG, Barsinghausen (DE)

(72) Inventor: Mahmud Keschwari Rasti, Barsinghausen (DE)

(73) Assignee: KES Keschwari Electronic Systems GmbH & Co. KG, Barsinghausen (DE)

( * ) Notice: Subject to any disclaimer, the term of this patent is extended or adjusted under 35 U.S.C. 154(b) by 0 days. days.

(21) Appl. No.: 15/280,396

(22) Filed: Sep. 29, 2016

(65) Prior Publication Data

US 2017/0088151 A1 Mar. 30, 2017

(30) Foreign Application Priority Data

Sep. 29, 2015 (DE) .................... 10 2015 218 815
Oct. 1, 2015 (DE) .................... 10 2015 219 058

(51) Int. Cl.
| | | |
|---|---|---|
| *F16D 55/226* | (2006.01) | |
| *B61H 15/00* | (2006.01) | |
| *F16D 65/66* | (2006.01) | |
| *F16D 65/18* | (2006.01) | |
| *F16D 121/24* | (2012.01) | |
| *F16D 125/40* | (2012.01) | |

(52) U.S. Cl.
CPC ........ *B61H 15/0057* (2013.01); *F16D 55/226* (2013.01); *F16D 65/183* (2013.01); *F16D 65/66* (2013.01); *F16D 2121/24* (2013.01); *F16D 2125/40* (2013.01)

(58) Field of Classification Search
CPC .... F16D 55/2245; F16D 55/226; F16D 65/66; F16D 65/183; F16D 2121/18; F16D 2121/24; F16D 51/20; F16D 51/22; F16D 2125/40; B61H 5/00; B61H 15/0057
USPC ..... 188/1.11 E, 1.11 IL, 28, 56, 74, 78, 325, 188/327, 328, 331, 333, 79.51
See application file for complete search history.

(56) References Cited

U.S. PATENT DOCUMENTS

| | | | |
|---|---|---|---|
| 4,850,459 A * | 7/1989 | Johannesen ........... | B60T 13/741 188/156 |
| 7,014,019 B2 * | 3/2006 | Krug ..................... | B60T 13/743 188/167 |
| 7,413,061 B2 | 8/2008 | Wagner et al. | |

FOREIGN PATENT DOCUMENTS

| | | | | |
|---|---|---|---|---|
| DE | 43 30 440 A1 | 3/1995 | | |
| DE | 195 09 540 C1 | 10/1996 | | |
| DE | 19945701 A1 * | 4/2001 | ............... | B61H 5/00 |
| EP | 2154391 A1 | 2/2010 | | |

* cited by examiner

*Primary Examiner* — Thomas J Williams
(74) *Attorney, Agent, or Firm* — Greer, Burns & Crain, Ltd.; Steven P. Fallon (57) ABSTRACT

A brake caliper for a disk brake or to a disk brake with a brake caliper for rail vehicles. A brake caliper has caliper arms at which at the ends brake shoes are mounted and which are pivotally driven against each other by a brake cylinder. The brake caliper or disk brake has the advantage that the brake cylinder and the wear adjusting device are contained in a common housing and that the wear adjusting device acts along the same linear axis of movement as the force which is generated between two carriers which are pivotally connected to the caliper arms and drive the same for pivoting in order to subject the brake shoes to tension against each other.

20 Claims, 3 Drawing Sheets

BRAKE CYLINDER WITH INTEGRATED WEAR ADJUSTING DEVICE FOR RAIL VEHICLES

PRIORITY CLAIM AND REFERENCE TO RELATED APPLICATION

The application claims priority under 35 U.S.C. § 119 and all applicable statutes and treaties from DE 10 2015 218815.9, filed on 29, Sep. 2015, and from DE 10 2015 219 058.7, filed on 1 Oct. 2015.

FIELD

Fields of the invention including braking devices and rail vehicles. The invention concerns brake calipers for disk brakes and disk brakes with a brake caliper for rail vehicles.

BACKGROUND

DE 195 09 540 C1 describes a brake caliper for a disk brake the caliper arms of which are pivoted against each other by a rotary arm eccentrically supported approximately centrally at one of the caliper arms wherein the rotary arm is rotated by a brake cylinder. A wear adjusting device with a spindle is arranged between the ends of the caliper arms opposite to the brake shoes mounted at the ends of the caliper arms wherein the spindle is moved out by rotating the spindle nut by a control rod which extends along a caliper arm and which is driven by a lever arm arranged at the rotary arm.

DE 43 30 440 A1 describes a brake caliper for a disk brake, the caliper arms of which are approximately centrally engaged by an arrangement of a force reservoir which is pivoted by an adjustment device and acts onto a rocker through a control curve so that the caliper arms and the brake shoes mounted at one end are pivoted towards one another. A wear adjusting device is arranged at the caliper end opposite to the brake shoes and has a gear box and a motor operator.

The above-cited prior art has the disadvantage that a wear adjusting device is arranged at one end of the caliper arms opposite to the brake shoes while the caliper arms are approximately centrally engaged by the force generating means of the brake caliper.

EP 2 154 391 B1 describes a force generating means of a brake caliper with a brake cylinder acting onto a wedge which is guided between two rollers in order to displace the same along a linear axis of movement against each other wherein the rollers act onto carriers located in the linear axis of movement and pivotally connected to the ends of the arms of a brake caliper. The one roller acts upon a spindle located in the linear axis of movement and having a spindle nut which, dependent on the movement of the spindle against a housing, is rotated by a spring compressed by this movement and defines a wear adjusting device.

SUMMARY OF THE INVENTION

Embodiments of the present invention are directed to a brake caliper for a disk brake or to a disk brake with a brake caliper for rail vehicles. A brake caliper has caliper arms at which at the ends brake shoes are mounted and which are pivotally driven against each other by a brake cylinder. The brake caliper or disk brake has the advantage that the brake cylinder and the wear adjusting device are contained in a common housing and that the wear adjusting device acts along the same linear axis of movement as the force which is generated between two carriers which are pivotally connected to the caliper arms and drive the same for pivoting in order to subject the brake shoes to tension against each other.

Embodiments of the invention provide an alternative brake caliper for a disk brake, especially a brake caliper with an alternative wear adjusting device which preferably is arranged in a common housing with a brake cylinder and especially has a force generating means with a wear adjusting device in a housing. Further preferred, the brake caliper is to allow a direct measurement of the force acting on the caliper arms which is generated by pressure acting onto the brake cylinder.

A preferred embodiment is a brake comprising two caliper arms at the end of which brake shoes are arranged each, and between which a force generating device is pivotally mounted by means of a first carrier and a second carrier spaced therefrom, characterized in that the first and the second carriers are arranged on a common linear axis of movement and the first carrier has a stud disposed along the linear axis of movement and guided longitudinally displaceably and torque-proof in a guidance arranged at the first end of a housing, and the second carrier is disposed at the opposite second end of the housing, wherein a first end of a spindle is rotatably supported at the stud, the spindle is guided in a spindle nut coaxially with respect to the stud in the housing, the spindle nut being guided in the housing torque-proof and displaceably parallel to the linear axis of movement and being driven along the linear axis of movement by a piston arranged in the housing and loadable with pressure, with a controlled motor arranged in the housing which motor is arranged to rotate the spindle against the housing.

LIST OF REFERENCE NUMBERS

| List of reference numerals | |
| --- | --- |
| 1 | first carrier |
| 2 | second carrier |
| 3 | linear axis of movement |
| 4 | housing |
| 5 | first end of housing |
| 6 | second end of housing |
| 7 | stud of the first carrier |
| 8 | guidance at the first end of the housing |
| 9 | longitudinal groove |
| 10 | pin |
| 11 | first end of spindle |
| 12 | spindle |
| 13 | force sensor |
| 14 | second end of spindle |
| 15 | shaft stud |
| 16 | motor, e.g. electric motor |
| 17 | peg |

-continued

| List of reference numerals | |
|---|---|
| 18 | longitudinal slot |
| 19 | spindle nut |
| 20 | pressure spring |
| 21 | distance sensor |
| 22 | microcontroller |
| 23 | piston, brake piston |
| 24 | wedge |
| 25, 25a, 25b | first press roller |
| 26, 26a, 26b | second press roller |
| 27 | pressure spring, readjustment spring for brake piston |
| 28 | cylinder |
| 29 | second piston |
| 30 | second cylinder |
| 31 | second pressure spring |
| 32 | extension |
| 33 | wall |
| 34 | pressure sensor |
| 35 | switch |
| 36 | linear guidance |
| 37 | spring abutment |

DETAILED DESCRIPTION OF THE PREFERRED EMBODIMENTS

The invention provides advantages, especially with a brake or brake caliper which has respective brake shoes at the ends of its two caliper arms. A force generating device is arranged between the caliper arms at the ends of the caliper arms opposite to the brake shoes, and a connection is arranged between the ends of the caliper arms, for instance approximately centrally, around which the caliper arms are pivotable.

The force generating device is articulated at the caliper arms with a first carrier arranged at the first end of the housing and with a second carrier arranged at the opposite second end of the housing. The first and second carriers are arranged on a common linear axis of movement along which the carriers are moved away from one another by the force of a piston. The first carrier has a stud which is guided longitudinally displaceably and torque-proof or rotationally fixed, respectively, in a guidance of a housing. The second carrier is fixed at the housing. The first end of a spindle is rotationally supported at the stud of the first carrier. The axis of the spindle is located coaxially to the linear axis of movement and coaxially to the longitudinal axis of the stud. The spindle is guided in a spindle nut which is guided in the housing in a torque-proof or rotationally fixed manner and parallelly displaceably with respect to the linear axis of movement in the housing. The spindle nut is displaceably driven in parallel to the linear axis of movement by a piston so that the spindle nut and with the same the spindle is displaceable along the linear axis of movement by the piston and with the spindle the stud of the first carrier is displaceable in its guidance.

Generally, the cylinder in which the piston is guided can be loaded by the pressure of the brake, for instance, by the pressure of the service brake.

The force generating device is preferably characterized by the feature that in the housing a sensor is arranged which is designed to take up the path and/or the position of the spindle along the linear axis of movement in the condition in which the brake shoes are spaced from one another, in which the brake linings lie against a brake disc. Generally, the force generating device is characterized by a motor driving the spindle to rotate, which is e.g. an electric motor, a pneumatic or a hydraulic motor, is arranged in the housing. The motor forms the drive for the spindle. The motor can be an electric, hydraulic or pneumatic rotary drive or linear drive. A hydraulic motor can e.g. be a hydraulic cylinder or a hydraulic linear motor or rotary motor, a pneumatic motor can e.g. be a pneumatic cylinder or a pneumatic linear motor or rotary motor.

In the following, an electric motor is mentioned as a representative of a motor. The electric motor is preferably controlled in dependence on a signal of the sensor for the position and/or for the path of the spindle in the housing. By the rotation of the spindle by the electric motor the spindle and thus the stud of the first carrier is displaced along the linear axis of movement relative to the spindle nut. The displaceability of the spindle nut and with the same of the spindle and of the stud of the first carrier along the linear axis of movement by the piston is not changed by the rotation of the spindle. So, the rotation of the spindle acts for the adjustment of the distance between the first carrier and the second carrier for the wear adjustment, wherein the piston displaces the spindle nut in order to form a service brake. Preferably, the electric motor is controlled to rotate the spindle only in a condition in which the piston forming the service brake is not loaded by pressure. The electric motor is preferably controlled in dependence on the signal of the sensor and together with the spindle forms a wear adjusting device. Since the wear adjusting device is arranged within the housing and is integrated into the drive means between the carriers, the force generating device according to the invention has the advantage that no slack adjuster is present outside of the housing which, for instance, engages the caliper arms with a spacing from the force generating device.

Preferably, the electric motor is controlled in dependence on the signal of the sensor in a manner that it rotates the spindle only when a predetermined path of the spindle nut in the housing is exceeded, and is especially set up for rotating the spindle nut for an amount which causes a displacement of the spindle nut for the amount that exceeds the predetermined path. Additionally or alternatively the electric motor is preferably controlled to move the spindle into a position along the linear axis of movement in which the carriers are moved away from one another only for a predetermined maximum path by the pressure loading of the piston, for instance, until the carriers have moved the caliper arms of the brake so far until the brake shoes have a distance from one another in which the brake linings have a predetermined distance from the brake disc.

The electric motor is for instance stationarily fixed in the housing, especially arranged with its shaft stud, optionally by means of a gear box, coaxially with regard to the axis of the spindle and rotationally fixedly connected to the same. Preferably, the electric motor is located at the second end within the housing. For the purposes of the invention the electric motor can have or contain a gear box driving the shaft stud, for instance. Preferably, the electric motor is a step motor. Preferably, the electric motor is controlled to rotate the spindle only in a case in which the piston is not loaded with pressure, for instance in the released condition of the brake.

The spindle is connected to the electric motor in a longitudinally displaceable manner in order to admit a longitudinal displacement of the spindle upon a movement of the spindle nut along the linear axis of movement which is driven by the piston. For this, the shaft stud of the electric motor is coaxially and longitudinally displaceably arranged with respect to the spindle directly or by means of a gear box and, for instance, by means of engagement means displaceable along the axis of the spindle is rotationally fixedly connected to the spindle, especially at the second end of the spindle which is located opposite to its first end and to the stud of the first carrier. Such an engagement means can, for instance, consist of a longitudinal slot in one of spindle and shaft stud and a peg guided in the longitudinal slot in the other member of spindle and shaft stud. The shaft stud can be arranged coaxially within or outside the spindle. Preferably, the shaft stud of the electric motor is longitudinally displaceably and torque-proofly guided in a coaxial bore of the spindle at the second end thereof, for instance by means of two pegs of the shaft stud which are displaceably guided in longitudinal slots of the spindle.

Preferably, the sensor by means of a data line is connected to an electronic microcontroller which is designed to control the electric motor in response to a signal of the distance sensor.

In a variant the sensor is a distance sensor which is designed to detect the path and/or the position of the spindle nut along the linear axis of movement, especially the path of the spindle nut along which the same is moved upon loading of the piston with pressure and/or the position of the spindle nut which the same takes upon loading of the piston with pressure. Since the spindle is engaged with the spindle nut the path and respectively the position of the spindle nut upon loading of the piston with pressure is the same as the path and the position of the spindle, respectively, when the electric motor stands still and the spindle is not rotated, respectively. Preferably, the distance sensor is a contact-free sensor.

In another variant the sensor is a force sensor which is designed to detect the force between the first end of the spindle and the stud of the first carrier. Here it is preferred that a microcontroller controlling the electric motor is designed to control the electric motor for the rotation of the spindle in the absence of pressure onto the piston until the force sensor detects a steeply increasing force acting from the spindle onto the stud as a signal for a distance of the brake shoes in which brake linings mounted thereon lie against a brake disc, and the microcontroller is designed to control the electric motor subsequently for the rotation of the spindle in the opposite direction for a predetermined amount. In this variant the brake is designed for the wear adjustment by the feature that in the condition, in which the piston does not load the spindle nut, the electric motor rotates the spindle until the force sensor shows the position of the brake linings lying against a brake disk by the force between the spindle and the stud of the first carrier steeply increasing. In this position of the spindle the brake linings lie against the brake disc. Therefore, the microcontroller is designed to control the electric motor for the rotation of the spindle in the opposite direction so that, without pressure loading of the piston, the spindle is located in a position along the linear axis of movement in which it does not apply a force between the carriers and the brake linings lie in a distance from the brake disc. The rotation of the spindle in the opposite direction results in a movement of the spindle in the direction towards the second end of the housing. The rotation of the spindle in the opposite direction occurs especially for a predetermined amount so that the spindle brings together the caliper arms and therefore also the brake linings into a predetermined distance with respect to one another. So, the rotation of the spindle in the opposite direction can occur until, for instance, the brake linings take in a predetermined distance with respect to one another, respectively, in which they take a predetermined distance from the brake disk.

The condition in which the piston does not load the spindle nut especially is a condition in which the cylinder in which the piston is guided is not loaded with pressure and the piston is not loaded by a second piston by means of an extension, either, which second piston, for instance, is loaded against the piston by means of a second pressure spring in the absence of operating pressure.

Preferably, a pressure spring is disposed between the first end of the housing and the spindle nut which loads the spindle nut away from the first end and in the direction towards the second end of the housing. Such a pressure spring defines a readjusting spring for the spindle nut which acts against the displacement caused by the piston. This pressure spring can be also designated as readjusting spring for the spindle and/or as readjusting spring for the service brake.

Optionally, especially in the second variant, a force sensor is arranged between the stud of the first carrier and the spindle to measure the force with which the spindle loads the stud. The force sensor can be disposed in a gap between the spindle and the stud of the first carrier wherein the gap or the force sensor, resp., is arranged to detect the force along the linear axis of movement. Therein, the spindle, especially its first end, can be supported at the stud coaxially, rotationally and displaceably along the linear axis of movement. Preferably, the housing at its first end has a common guidance for the stud and the spindle. Optionally, the stud and the spindle have the same outer diameter within a common guidance.

Further optionally, a pressure sensor can be arranged in the cylinder in which the piston is guided in order to detect the pressure acting onto the piston. Preferably, the pressure sensor and the force sensor are connected to an electronic microcontroller which is designed to compare the measuring signal of the force sensor with the measuring signal of the pressure sensor and which is preferably further designed to indicate deviations of the ratio between the measuring signal of the force sensor and the measuring signal of the pressure sensor from a predetermined amount or amount range. In this embodiment the brake is designed to indicate a malfunction, for instance a force which is too small for the pressure applied inside the cylinder.

Further optionally, the microcontroller can be designed to determine the path along which the spindle was moved by rotation by the electric motor in the direction towards the first end and preferably to indicate the arrival over a predetermined path for which the spindle was moved by rotation in the spindle nut. In this embodiment, the brake is designed to indicate the attainment of a predetermined wear of the brake shoes or the brake linings mounted thereon, resp. Therein, preferably, the microcontroller is designed to add up the respective paths along which the spindle is moved in the direction towards the first end of the housing by rotation by means of the electric motor and optionally to indicate, to transmit and/or to compare the same with a predetermined amount, wherein the predetermined amount corresponds to an allowable wear of the brake linings. Preferably, the respective paths along which the spindle is moved in the direction towards the first end of the housing by rotation by means of the electric motor are determined by the distance sensor.

Further optionally, the microcontroller can be designed to determine the path of the spindle nut along which the same moves in the direction towards the first end of the housing at brake pressure applied and to transmit this path, wherein this path can be indicated as a measure for the wear of the brake disk when new brake linings having a certain thickness are mounted. For this, the path of the spindle nut can be determined by the sensor which, in a variant, is a distance sensor detecting the path of the spindle nut in the housing. Alternatively, the sensor can be formed by a force sensor arranged between the spindle and the stud of the first carrier, as described here, wherein the microcontroller is designed to detect the rotations transmitted by the electric motor onto the spindle and to calculate the path from these along which the spindle is moved along the linear axis of movement until the force sensor indicates the engagement of the brake linings with the brake disk by a steeply increasing force.

Preferably, the microcontroller is designed to be connected to the brake system of a rail vehicle, for instance by means of an electronic system, in order to transmit data. For this, the microcontroller can have an electronic system, for instance, which forms a bus system which can be cable-less or cable-bound.

The force generating device can have a manual control system by which the electric motor is moved for the rotation of the spindle into its position near the second end of the housing in order to open the brake caliper in this position and to exchange the brake linings. Additionally, the force generating device can include a manual control system by which the electric motor is controlled for the rotation of the spindle in order to move the same into a position in which the brake linings have a predetermined distance with respect to one another or to a brake disk arranged between these. In this embodiment the force generating device allows a motoric movement of the brake caliper into an opened position and preferably a motoric movement of the brake caliper into a position of the brake linings in a desired distance with respect to one another or to a brake disc, resp.

In a first embodiment, the piston, which is generally also designated as a brake piston and is loadable with pressure in a controlled manner in order to form a service brake, can act upon a wedge which acts between the second end of the spindle or between the spindle nut on the one side and the second end of the housing on the other side, respectively, so that the spindle or the spindle nut, resp., is displaced along the linear axis of movement from the second end of the housing to the first end of the housing. Preferably, the spindle nut has a first press roller the rotary axis of which being arranged perpendicularly to the spindle axis or to the linear axis of movement, and a second press roller is mounted at the housing and has a rotary axis which is arranged parallel to the rotary axis of the first press roller, wherein the wedge is guided between the first and the second press rollers. Preferably, the press rollers each have two respective partial press rollers which are arranged on both sides of the spindle.

Preferably, in a first embodiment, a pressure spring is disposed at the piston which acts against the pressure acting upon the piston. This pressure spring can correspondingly be designated a readjustment spring for the service brake. Preferably, in this embodiment the pressure spring is mounted between a spring abutment stationarily mounted at the housing and the piston, especially perpendicularly to the spindle axis. The spring abutment for the pressure spring can be arranged adjacent to the spindle nut and, for instance, can form a part of the guidance for the spindle nut in the housing. Optionally, the guidance for the spindle nut is arranged between a wall of the housing and the spring abutment or is formed by a wall of the housing and the spring abutment.

In a second embodiment the piston is arranged at the spindle nut and can be connected to the spindle nut in a fixed manner or be formed with the spindle nut in a one-piece manner. Accordingly, the distance sensor can be designed to measure the path of the piston relative to the housing. The piston is guided in a cylinder which is arranged in parallel to the linear axis of movement, for instance, coaxially to the spindle axis or to the linear axis of movement, respectively. The cylinder is arranged in a first portion of the housing and is designed to act load the piston in the direction towards the first end of the housing upon loading with pressure. The cylinder can be formed in a one-piece manner in the housing. In this embodiment an optional pressure spring disposed between the first end of the housing and the piston acts both as a readjustment spring for the spindle nut and as a readjustment spring for the piston. This piston acts as service brake since upon the loading with pressure it loads the spindle nut and thus the spindle in the direction towards the first end of the housing.

Preferably, in the embodiments of the invention a second piston in a second cylinder is arranged in the housing coaxially to the piston. Generally, the second piston has an extension which, in a position that the second piston takes without the application of pressure, lies against the first piston, which is also designated as a brake piston. The second cylinder is designed to load the second piston with pressure which loads the second piston in the direction towards the second end of the housing so that upon loading with pressure, the second piston is moved away from the first piston and does not apply any force upon the first piston or brake piston, resp. A pressure spring is arranged between the second piston and the second end of the housing which pressure spring loads the second piston in the direction towards the first piston so that the extension of the second piston is loaded against the first piston. Therefore, the second piston acts as a locking brake which without pressure present by the pressure spring loading the second piston in the direction towards the first piston, loads the spindle nut towards the first end of the housing. Generally, the second piston can be loaded with pressure on its piston surface facing the brake piston and is loaded in the direction towards the brake piston by the second pressure spring, wherein the second piston has an extension which in the condition without pressure loading loads the brake piston by the second pressure spring. In the first embodiment the arrangement consisting of brake piston and second piston is disposed at the wedge in order to load the same in the direction to the intermediate space between the press rollers. In the second embodiment the brake piston and the second piston are preferably arranged coaxially with regard to the linear axis of movement or coaxially with regard to the spindle axis, resp., wherein the brake piston is fixed at the spindle nut.

Generally, the brake piston and the second piston can be arranged along a common axis of movement. In the second embodiment the second piston is preferably arranged displaceably on the spindle, and further preferred, both pistons or cylinders, resp., are arranged coaxially with regard to the linear axis of movement or to the spindle axis, resp.

Preferably, the extension of the second piston is tubularly formed and arranged coaxially to the spindle axis. Optionally, the two walls on the head-sides of both cylinders extend approximately radially with regard to the spindle axis or radially with regard to the linear axis of movement, resp. This embodiment is shown in the figures with respect to the second embodiment according to which the second piston is moreover arranged coaxially with regard to the spindle axis or to the linear axis of movement, resp.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

In the figures identical reference numbers designate functionally identical elements. The arms of the brake caliper are not shown. The figures show the sensor both in the first variant as distance sensor 21 between spindle nut 19 and housing 4 and in the second variant as force sensor 13 between the first carrier 1 and the spindle 12. The first carrier 1 and the second carrier 2 which are arranged on a common linear axis 3 of movement at the housing 4 are provided for the articulation to a respective caliper arm of a brake.

The second carrier 2 is arranged at the second end 6 of the housing 4 which is located opposite to its first end 5. Accordingly, the force generated by the force generating device loading the first carrier 1 in a direction away from the second carrier 2, for the spreading of two caliper arms, can be pivotally mounted at their ends, wherein at their opposite ends brake shoes are mounted and which between their ends are pivotally connected to each other.

The first carrier 1 is disposed at the first end 5 of the housing 4 and has a stud 7 guided in a guidance 8 which extends along the linear axis of movement 3 at the first end 5 of the housing 4. The stud 7 is guided in a torque-proof manner along the linear axis of movement 3 within the guidance 8, for instance by a longitudinal groove 9 in the stud 7 into which a pin 10 fixed at the first end 5 displaceably engages, for instance in the guidance 8.

The first end 11 of the spindle 12 is rotationally supported at the stud 7, for instance, the stud 7 is disposed in a coaxial dead hole of the spindle 12. Since the stud 7 is guided in the guidance 8 at the first end 5 of the housing in a longitudinally displaceably manner secured against rotation, the spindle 12 can rotate relative to the stud 7.

According to a preferred embodiment a force sensor 13 is arranged between the spindle 12 and the stud 6 of the first carrier 1 in order to measure the force with which the spindle 12 is loaded against the stud 7.

Preferably, the guidance 8 is rotationally symmetrical to the linear axis of movement 3, for instance a bore at the first end 5 of the housing 4, and the first end 11 of the spindle 12 is guided rotationally and longitudinally displaceably in the guidance 8.

The second end 14 of the spindle 12 opposite to the first end 11 is connected longitudinally displaceably and rotationally fixed to the shaft stud 15 of an electric motor 16 which is fixed at the second end 6 of the housing 4. In the embodiment shown in the figures the shaft stud 15 is arranged coaxially in a dead hole at the second end of the spindle 12 in a longitudinally displaceable manner along the linear axis 3 of movement which is generally preferably identical with the spindle axis. The shaft stud 15 has pegs 17 which are guided in longitudinal slots 18 arranged along the spindle 12. In this manner the electric motor 16 can rotate the spindle 12 by means of its shaft stud 15 while the spindle 12 rotates in the spindle nut 19 guided torque-proof and displaceably at the housing and moves along the linear axis 3 of movement. A pressure spring 20 is arranged between the spindle nut 19 and the first end 5 of the housing 4 which loads the spindle nut 19 in the direction towards the second end 6 of the housing 4.

According to the first variant a distance sensor 21 is arranged in the housing 4 as sensor which is designed to measure the path of the spindle nut 19 along the linear axis of movement 3. The distance sensor 21 is connected to a microcontroller 22 which, for instance, is an electronic calculator, for transmitting a signal for the movement or position of the spindle nut 19, resp., in the housing 4. As shown in the figures, the distance sensor 21 can be arranged between the housing 4 and the side of the piston 23 facing away from the cylinder 28.

The microcontroller 22 is connected to the electric motor 16 for transmitting a control signal, wherein the microcontroller 22 is designed to generate the control signal in dependence on the signal of the distance sensor 21. Especially, the microcontroller 22 is designed to compare signals for the movement or position of the spindle nut 19 in the housing 4 transmitted by the distance sensor 21 with a predetermined amount for the movement or position, resp., of the spindle nut 19 and to control the electric motor 16 dependent on this comparison. Therein, the microcontroller 22 can be designed to control the electric motor 16 in such a manner that the same rotates the spindle 12 until the spindle 12 has been moved with respect to the spindle nut 19 for the amount which results from this comparison.

Accordingly, the force generating device contains a wear adjusting device formed with or consisting of the spindle 12 the first end 11 of which being rotationally supported at the stud 7 of the first carrier 1, the spindle nut 12 guided displaceably along the linear axis of movement 3 and rotationally fixed within the housing 4, the distance sensor 21 as a sensor determining the path of the spindle nut 19 with respect to the housing 4, and the electric motor 16 controlled in dependence on a signal of the distance sensor 21, which electric motor 16 is stationarily disposed in the housing 4 and the shaft stud 15 thereof is connected to the second end 14 of the spindle 12 coaxially, longitudinally displaceably and rotationally fixed. As alternative to the sensor formed as distance sensor 21, the sensor can be formed by a force sensor 13 arranged between the spindle 12 and the stud 7, wherein the electric motor 16 is controlled by a microcontroller 22 to rotate the spindle 12 until the force sensor 13 receives a steeply increasing force as signal.

The longitudinal slots 18 at the second end 14 of the spindle 12 move along the pegs 17 upon the displacement of the spindle 12 in the direction towards the first end 5 of the housing 4. The pegs 17 allow a rotation of the spindle 12 by the shaft stud 15 of the electric motor 16.

The second variant of the sensor is represented by the force sensor 13 which receives the force between the first end 11 of the spindle 12 and the stud 7 of the first carrier 1. In a condition of the brake in which the piston 23 is not loaded with pressure acting against the spindle nut the microcontroller 22 is designed to control the electric motor 16 for the rotation of the spindle 12 until the force sensor 13 receives a force acting from the spindle 12 upon the stud 7. This condition of the brake is, for instance, a condition of the absence of pressure upon the piston 23 in the cylinder 28 and of the absence of pressure by a second cylinder 30 which, by means of an extension 32, acts upon the piston 23 which, for instance, is driven by a second pressure spring 31. Preferably, the force is a force which steeply increases during the rotation of the spindle and thus indicates the engagement of brake linings mounted on the brake shoes with a brake disk and, for instance, is not caused by frictional forces within the brake. Therein, the microcontroller 22 is designed, at the signal of the force sensor 13 for a steeply increasing force between the spindle 12 and the stud 7 of the first carrier 1, to stop and to subsequently control the electric motor 16 for the rotation of the spindle 12 in the opposite direction for a predetermined amount in order to space the brake linings apart from the brake disk 16. The predetermined amount for the distance is the one for which the brake shoes or brake linings are moved against each other and against the brake disk by the action of the brake piston 23.

Figure 1:
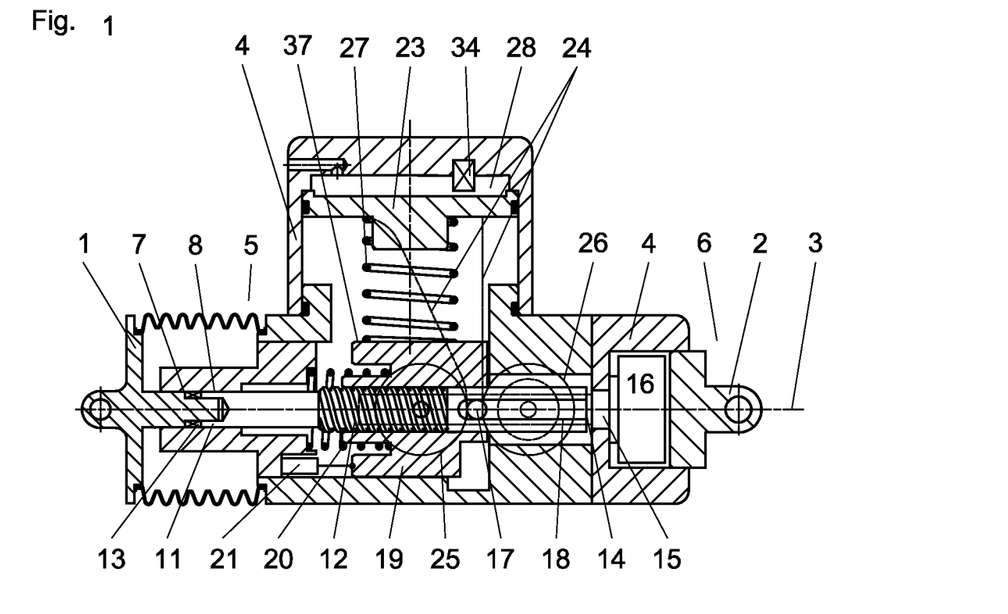
FIG. 1 is a sectional view of an embodiment of a force generating device according to the invention in a position of the piston without pressure loading, FIG. 2 a sectional view of FIG. 1 turned by 90°, FIG. 3 a sectional view of the embodiment of FIG. 1 in a position of the piston with pressure loading, FIG. 4 a sectional view of FIG. 3 turned by 90°, and FIG. 5 a sectional view of an embodiment of the force generating device according to the invention.
Figure 2:
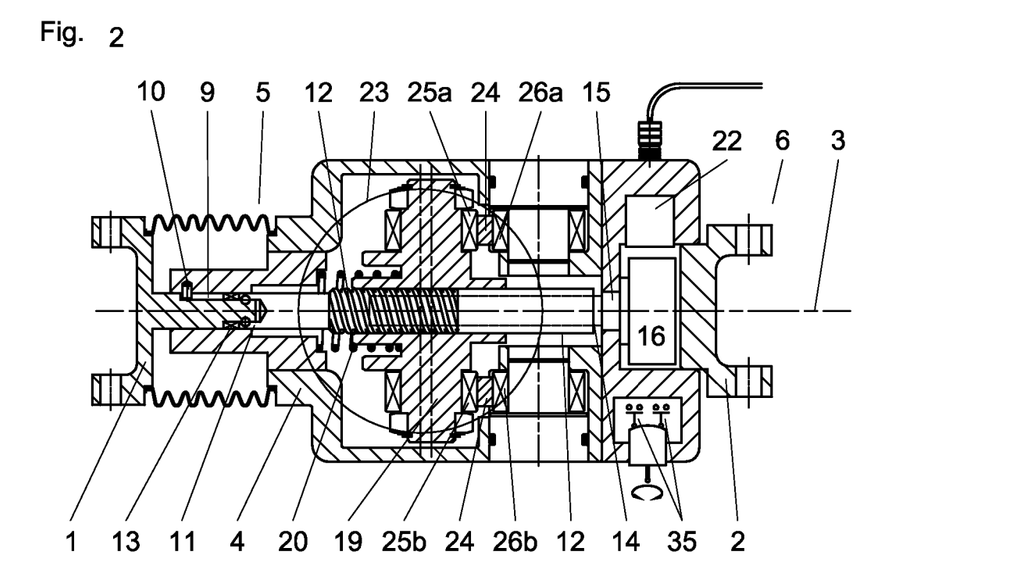

FIGS. 1 to 4 show the drive of the spindle nut 19 and of the spindle 12 connected to the spindle nut 19, resp., in the first embodiment of the force generating device according to the invention. Therein, FIGS. 1 and 2 show the piston 23 which is also designated as brake piston and which is connected to a wedge 24 guided between a first press roller 25 preferably formed by two partial rollers 25a, 25b arranged laterally from the spindle 12 at the spindle nut 19, as shown, on the one side and a second press roller 26 stationarily disposed at the housing on the other side. Preferably, the second press roller 26 is formed by two partial rollers 26a, 26b, as shown. The rotary axes of the first press roller 25 and of the second press rollers, resp. their first partial rollers 25a, 25b or of the second partial rollers 26a, 26b are arranged perpendicularly to the linear axis of movement 3 and to the spindle axis, resp. The first press roller 25 is mounted at the spindle nut 19 so that the movement of the wedge 24 between the first press roller 25 and the second stationary press roller 26 results in a displacement of the spindle nut 19 and of the spindle 12 which is in engagement with the spindle nut 19.

FIGS. 1 and 2 show the piston 23 in the position not loaded by pressure in which the wedge 24 adjusts a small distance between the first press roller 25 and the second press roller 26. In the embodiment shown here the wedge 24 is guided perpendicularly against the linear axis of movement 3 or spindle axis, resp., correspondingly, the central axis of the piston 23 and of the cylinder 28 guiding the same, is arranged perpendicularly to the linear axis of movement 3 or to the spindle axis, resp. The pressure spring 27 arranged between the spring abutment 37 fixed at the housing 4 and the piston 23 loads the piston 23 into its position not loaded by pressure in the cylinder 28 so that the pressure spring 27 can be also designated a readjustment spring for the brake piston 23. In the first embodiment the guidance for the spindle nut 19 is optionally formed by the wall of the housing 4 and the parallel spring abutment 37.

Figure 3:
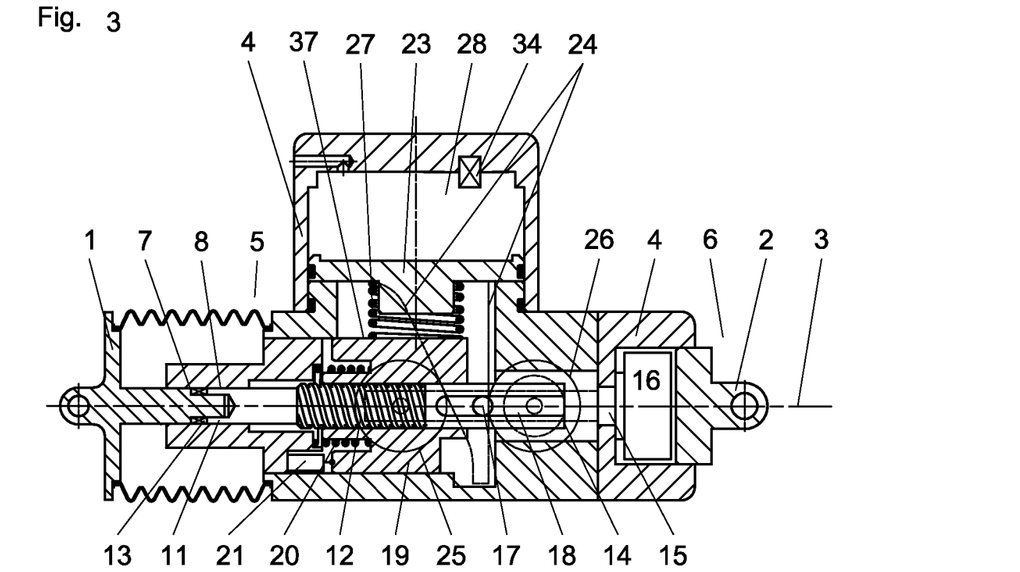
Figure 4:
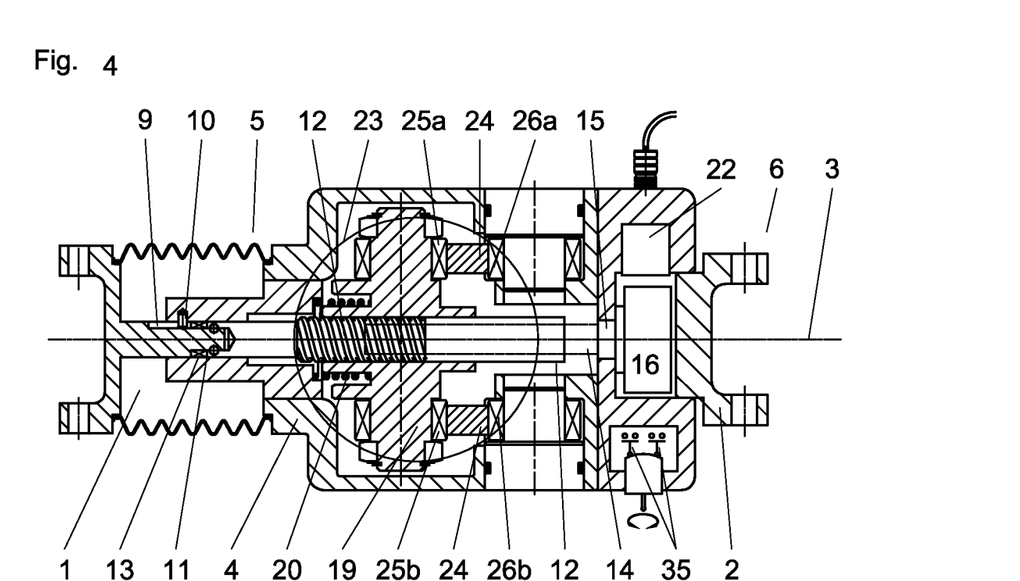

FIGS. 3 and 4 show the piston 23 in its position loaded by pressure in the cylinder 28 in which the wedge 24 moves the first press roller 25 in the direction towards the first end 5 of the housing 4, wherein the pressure spring 20 is compressed between the spindle nut 19 and the first end 5 of the housing 4. The spindle nut 19 moves the spindle 12 in the direction towards the first end 5 of the housing 4 so that the first carrier 1 by its stud 7 is moved away from the second carrier 2.

Optionally, a switch 35 is mounted at the housing which is designed for the manual control of the electric motor 16 in order to move the spindle 12 by the same.

Figure 5:
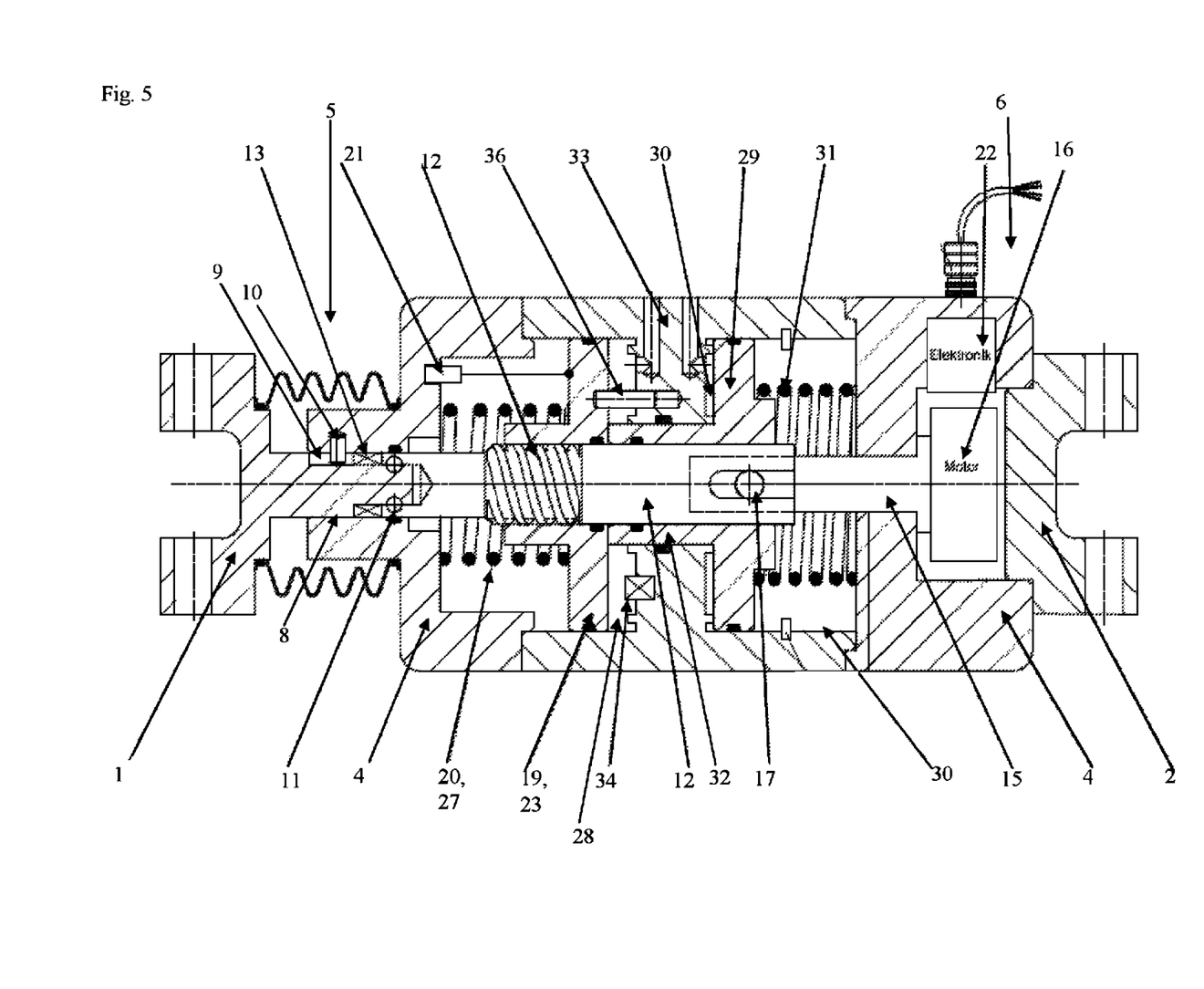

By means of the example of the second embodiment FIG. 5 shows the drive of the spindle nut 19 or the drive of the spindle 12 connected to the spindle nut 19 of the force generating device according to the invention in a preferred embodiment which, in addition to the brake piston 23 in a cylinder 28, contains a second piston 29 guided in a cylinder 30 in the housing 4. The second piston 29 is arranged coaxially with respect to the linear axis of movement 3 or to the spindle axis, resp., and is loaded by a second pressure spring 31 in the direction towards the braking piston 23, while the second cylinder 31 is arranged to move the second piston 29 upon loading with pressure away from the braking piston 23 and against the second pressure spring 31. The second piston 29 has a tubular extension 32 which is loaded by the second pressure spring 31 against the first piston in a position of the second piston 29 without loading of the second cylinder 31 with pressure. In this position the second piston 29 through its extension 32 loads the brake piston 23 and the spindle nut 29 connected to it and thus the spindle 12 in the direction towards the first end 5 of the housing 4, so that without loading of its second cylinder with pressure the second piston 29 acts as locking brake.

In the embodiment shown in FIG. 5 the extension 32 of the second piston 29 is formed tubularly coaxially around the spindle 12. The cylinder 28 in which the brake piston 23 and the spindle nut 19 connected therewith are guided, and the second cylinder 30 are arranged coaxially with respect to the linear axis of movement 3 or the spindle axis, resp., wherein a wall 33 arranged between these cylinders separates the cylinders and optionally forms the respective cylinder head. The spindle nut 19 can be rotationally fixed and displaceable with respect to the housing 4, for instance, by a linear guidance 36 in the form of a pin which is guided in a bore fixed at the housing 4.

In every embodiment shown a pressure sensor 34 is arranged in the cylinder 28, in which the brake piston 23 is guided or is loaded with pressure in order to drive the spindle nut 19 in the direction towards the first end 5 of the housing 4.

Generally, the second carrier 2 can be connected to the second end 6 of the housing 4 in a fixed manner.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A brake comprising two caliper arms at the end of which brake shoes are arranged each, and between which a force generating device is pivotally mounted by means of a first carrier and a second carrier spaced therefrom, characterized in that the first and the second carriers (1, 2,) are arranged on a common linear axis of movement and the first carrier has a stud disposed along the linear axis of movement and guided longitudinally displaceably and torque-proof in a guidance arranged at the first end of a housing , and the second carrier is disposed at the opposite second end of the housing, wherein a first end of a spindle is rotatably supported at the stud, the spindle is guided in a spindle nut coaxially with respect to the stud in the housing, the spindle nut being guided in the housing torque-proof and displaceably parallel to the linear axis of movement and being driven along the linear axis of movement by a piston arranged in the housing and loadable with pressure, with a controlled motor arranged in the housing which motor is arranged to rotate the spindle against the housing.

2. The brake according to claim 1, comprising a sensor arranged in the housing which is designed for measuring the position of the spindle in the housing in the condition in which the brake shoes are spaced from one another and in which brake linings mounted thereon lie against a brake disc, and in that the motor is controlled in dependence on a signal of the sensor for the position of the spindle in the housing.

3. The brake according to claim 2, wherein the sensor is a distance sensor disposed in the housing which is arranged to detect the path of the spindle nut along the linear axis of movement.

4. The brake according to claim 2, wherein the sensor is a force sensor which is arranged to detect the force between the first end of the spindle and the stud of the first carrier.

5. The brake according to claim 4, comprising a microcontroller which is arranged to control the motor for rotation of the spindle in the absence of pressure upon the piston until the force sensor receives a steeply increasing force acting from the spindle upon the stud as a signal for a distance between the brake shoes, at which brake linings mounted thereon lie against a brake disc, and the microcontroller is arranged to control the motor for rotating the spindle in the opposite direction for a predetermined amount.

6. The brake according to claim 1, wherein the carriers of the force generating device are each arranged at the ends of the caliper arms, which are pivotally connected between the force generating device and the brake shoes by means of a link.

7. The brake according to claim 1, wherein the motor is stationarily fixed in the housing and is connected to the spindle by means of a shaft stud which is arranged along the linear axis of movement and which is connected to the spindle in a longitudinally displaceable and rotationally fixed manner.

8. The brake according to claim 1, comprising a first press roller mounted at the spindle nut the rotary axis of which being arranged perpendicularly to the linear axis of movement, and a second press roller spaced from the first press roller, the rotary axis of which is in parallel to the rotary axis of the first press roller is stationarily mounted at the housing, wherein the piston is connected to a wedge which is guided between the first and the second press rollers.

9. The brake according to claim 1, wherein the piston is arranged at the spindle nut and is guided in a first cylinder which is arranged in parallel to the linear axis of movement and which is formed in a portion of the housing disposed between the piston and the second end of the housing.

10. The brake according to claim 1, wherein the spindle nut is loaded by a pressure spring arranged between the spindle nut and the first end of the housing.

11. The brake according to claim 1, wherein the piston is loaded by a pressure spring opposite to the direction into which it is loaded by pressure loading.

12. The brake according to claim 9, comprising a second piston guided in a second cylinder that is loadable with pressure on its piston surface facing the piston and is loaded in the direction towards the piston by a second pressure spring, wherein the second piston has an extension which is loaded by the second pressure spring against the piston in the condition without pressure loading of the second cylinder.

13. The brake according to claim 12, wherein the second piston is displaceably arranged on the spindle in a second portion of the housing which is arranged between the first cylinder, in which the piston disposed at the spindle nut is guided, and the second end of the housing and that the extension of the second piston extends along the spindle.

14. The brake according to claim 3, wherein the motor is controlled to rotate the spindle, when a predetermined amount for the path of the spindle nut is exceeded by the path of the spindle nut taken up by the distance sensor, until the spindle nut has been moved for the exceeding amount in the direction to the first end of the spindle.

15. The brake according claim 9, comprising a force sensor arranged between the stud of the first carrier and the spindle, that a pressure sensor is arranged in the cylinder, in which the piston disposed at the spindle nut is guided, and in that a microcontroller is designed to compare the signal of the force sensor to the signal of the pressure sensor.

16. The brake according to claim 1, wherein the motor is provided with a control for the rotation of the spindle into a position of smallest distance to the second end of the housing.

17. The brake according to claim 1, comprising a microcontroller which is configured to add up the respective paths for which the spindle is moved by rotation by means of the motor and to transmit the same as measure for the wear of brake linings of the brake.

18. The brake according to claim 1, comprising a microcontroller which has an electronic system which is configured to be connected to a bus system of a rail vehicle.

19. The brake according to claim 1, comprising a microcontroller which is configured to transmit the path for which the spindle is moved by rotation by means of the motor when brake linings of known thickness are mounted on the brake shoes as a measure for the wear of a brake disk arranged between the brake linings.

20. The brake according to claim 1, wherein the motor comprises an electric, hydraulic or pneumatic rotary drive or linear drive, an electric motor, a pneumatic cylinder, a pneumatic motor or a hydraulic cylinder or a hydraulic motor.

* * * * *